US008671569B1

(12) United States Patent
White et al.

(10) Patent No.: US 8,671,569 B1
(45) Date of Patent: Mar. 18, 2014

(54) ACCUMULATOR BORE REPAIR KIT AND REPLACEMENT PISTONS

(75) Inventors: Robert T. White, Tallahassee, FL (US); James L. Arledge, Havana, FL (US); Dennis C. Erickson, St. Marks, FL (US); Dennis C. Erickson, Jr., Tallahassee, FL (US); Russell K. Erickson, Tallahassee, FL (US)

(73) Assignee: Superior Transmission Parts, Inc., Tallahasse, FL (US)

( * ) Notice: Subject to any disclaimer, the term of this patent is extended or adjusted under 35 U.S.C. 154(b) by 938 days.

(21) Appl. No.: 12/770,054

(22) Filed: Apr. 29, 2010

Related U.S. Application Data (60) Provisional application No. 61/213,028, filed on Apr. 29, 2009.

(51) Int. Cl.
*B23P 6/00* (2006.01)
*B23P 11/00* (2006.01)
*F02F 3/00* (2006.01)

(52) U.S. Cl.
USPC ............ 29/888.041; 29/888.011; 29/888.024; 29/888.42; 29/402.01; 29/213.1; 29/226

(58) Field of Classification Search
USPC ......... 29/888.011, 888.021, 888.041, 888.42, 29/801, 402.01–402.08, 213.1, 226
See application file for complete search history.

(56) References Cited

U.S. PATENT DOCUMENTS

| | | | | | |
|---|---|---|---|---|---|
| 3,348,575 | A | * | 10/1967 | Simak | 137/614.05 |
| 3,693,351 | A | * | 9/1972 | Minkus | 60/370 |
| 4,461,937 | A | * | 7/1984 | Boni | 200/82 B |
| 4,608,824 | A | * | 9/1986 | Gagnon | 60/325 |
| 5,109,564 | A | * | 5/1992 | Horvath | 15/236.06 |
| 6,071,284 | A | * | 6/2000 | Fox | 606/80 |
| 6,722,385 | B1 | * | 4/2004 | Bolaski | 137/15.17 |
| 6,832,632 | B1 | * | 12/2004 | Wallace | 137/625.66 |
| 6,907,974 | B2 | * | 6/2005 | Rowell | 192/85.59 |
| 7,507,149 | B1 | * | 3/2009 | Douglas | 451/321 |
| 7,980,829 | B2 | * | 7/2011 | Schuetzle et al. | 417/273 |
| 2002/0094437 | A1 | * | 7/2002 | Niizaki et al. | 428/364 |
| 2007/0230947 | A1 | * | 10/2007 | Chapman | 396/428 |
| 2009/0199403 | A1 | * | 8/2009 | Younger | 29/890.121 |

* cited by examiner

*Primary Examiner* — Perer DungBa Vo
*Assistant Examiner* — Kaying Kue

(57) ABSTRACT

A cleaning and piston replacement kit for an accumulator of a vehicle transmission which includes a brush for cleaning, reconditioning and polishing worn accumulator bores and replacement pistons each of which includes a pair of sealing rings for supporting and spacing the replacement pistons from the accumulator bores to thereby prevent scrapping of the walls of the bores by movement of the pistons within the bores and a method of reconditioning the accumulator bore.

12 Claims, 7 Drawing Sheets

ACCUMULATOR BORE REPAIR KIT AND REPLACEMENT PISTONS

CROSS REFERENCE TO RELATE APPLICATIONS

This application is related to and claims the benefit of U.S. Provisional Patent Application 61/213,028 filed Apr. 29, 2009, in the name of the same inventors, the contents of which are incorporated entirely herein by reference.

BACKGROUND OF THE INVENTION

1. Field of the Invention

The present invention is generally directed to the field of automotive transmission repairs and more specifically to a repair kit including a brush for cleaning, reconditioning and polishing worn accumulator valves and bores of a variety of automotive engines such as, by way of example, the 4F27E transmissions used in 1999 to present Ford Focus®, 1999 to present Mazda Protégé®, Mazda 3®, Mazda 6® and Mazda J39A® vehicles. Each kit includes a pair of replacement accumulator pistons, each having a pair of Teflon® sealing rings and valve springs. In some embodiments, the kit may also include one or more replacement solenoid regulator springs, solenoid control valve springs and pressure regulator valve springs.

2. Brief Description of the Related Art

The original factory design of the two aluminum accumulator valve bores of 4F27E transmissions used in 1999 to present Ford Focus®, 1999 to present Mazda Protégé®, Mazda 3®, Mazda 6® and Mazda J39A® vehicles, does not allow sufficient clearance or sealing area between the jacket of the pistons and the bore walls such that with the slightest of contamination, galling and scoring of the bore walls occurs which leads to leakage of transmission fluid within the transmission and thus transmission failure due to forward clutch circuit leaks and/or band failures.

The foregoing bores control accumulator pressure to the forward clutch circuit, N/D accumulator piston, and the second gear band apply accumulator, ½ accumulator piston. During use, a central portion of the walls of the bores begin to wear, being scored by the pistons being moved therein. Although the pistons are formed of cast aluminum, they are provided with a hard coating that can easily scar or scratch the internal soft aluminum walls of the accumulator bores, thus creating the leakage problem that is leading to transmission failures.

The same problems are associated with the accumulator pistons and bores of other vehicles such as Ford®, Toyata®, Generaly Motors® vehicles, Honda®, Mercury®, Linclon®, Mazda®, Land Rover®, BMW®, Audi®, Volvo®, Chrysler®, Nissan®, Jaguar®, Jeep® as well as others.

In view of the foregoing, there is a need to provide a repair kit that can be used to both refinish and polish the walls of the bores and which also provides a pair of replacement pistons that are used to replace the existing pistons so as to more efficiently operate within the accumulator valve bores without damaging the walls defining the bores.

SUMMARY OF THE INVENTION

Repair kits for the accumulator bores of a variety of vehicle transmission/transaxle assemblies wherein the accumulator bores and pistons of 4F27E transmissions are described in detail as an example. The same or very similar methods, piston replacements, sealing rings and the like are applicable to many different makes and models of vehicles. The 4F27E transmissions are used in 1999 to present Ford Focus®, 1999 to present Mazda Protégé®, Mazda 3®, Mazda 6® and Mazda J39A® vehicles. Each kit includes a brush for cleaning and polishing the piston bores and a pair of replacement accumulator pistons, each of which is provided with a pair of spaced high temperature Teflon® sealing rings that will prevent further scratching and scraping of the soft walls of the accumulator bores.

The brush that is included in the kit is a bottle type cylindrical brush having a diameter of approximately 1⅜. The bristles are made from extruded aluminum oxide and nylon fill that are bound in a spiral relationship to a central shaft or shank formed of twisted metal having a free end portion that is adapted to be retained in a chuck of a power drill. The bristles are coated and/or impregnated with the aluminum oxide that provides a polishing function when the brush is driven within an accumulator bore being repaired, such as when rotated by an electric or pneumatic hand drill.

Each repair kit includes a pair of replacement valve pistons that are designed and sized to reciprocate within the accumulator bores after the bores have been cleaned and polished. Each bore has one end having an opening for receiving an apply fluid and an opposite end with an opening forming a fluid exhaust. In order to seal each piston between the two openings, each piston includes two pair of spaced annular flanges that are integrally formed with the body of the piston but which extend outwardly therefrom a distance which is slightly less than a diameter of the bores. The spaced flanges define annular seats in which high temperature, scarf cut, Teflon® sealing rings are frictionally received such that an outer annular surface of the sealing rings is in sealed contact with the inner walls of a bore. The two sets of flanges are generally equally spaced from each other and the adjacent end of the body of the piston such that they are balanced relative to the piston. As each piston reciprocates within a bore after a repair is made, the sealing rings will prevent future scarring and wearing of areas of the bores which are generally between the sets of flanges over which the seal rings slide.

In some embodiments of the invention, each kit may also include one or more replacement solenoid regulator springs, solenoid control valve springs and pressure regulator valve springs. The original equipment springs tend to wear quickly and thus should be replaced when the new accumulator pistons are being installed. The kit may also include a 0.055" or other size drill bit that may be used to provide an opening between two passages within the lower body of the valve assembly.

It is a primary object of the invention to provide a repair kit for re-finishing and polishing worn accumulator piston bores in a plurality of makes and models of vehicles including those associated with 4F27E transmissions used in 1999 to present Ford Focus®, 1999 to present Mazda Protégé®, Mazda 3®, Mazda 6® and Mazda J39A® vehicles which includes at least one cylindrical rotary brush having bristles coated or impregnated with aluminum oxide for use in cleaning and polishing the accumulator bores and a pair replacement pistons that can be used to replace the original pistons and which are designed to prevent further damage to the accumulator bores.

It is another object of the invention to provide a repair kit for re-finishing worn accumulator piston bores that includes a pair of replacement accumulator pistons each of which is provided with a pair of spaced annular Teflon® sealing rings that support the replacement piston within one of the two cleaned bores in such a manner as to reduce or prevent further damage to the walls of the bores as the piston reciprocate within the bore.

It is yet another object of the invention to provide a repair kit for refurbishing the accumulator valve bores that may also include replacement springs for a solenoid regulator, solenoid control valve and a pressure regulator valve of the a variety of transmissions.

BRIEF DESCRIPTION OF THE DRAWINGS

A better understanding of the invention will be had with reference to the accompanying drawings wherein.

DESCRIPTION OF THE PREFERRED EMBODIMENT

The present invention is directed to a kit for use in cleaning and polishing accumulator bores and replacing pistons associated with such bores in a variety of automotive vehicles with the accumulator bores and pistons of 4F27E transmissions being disclosed, by way of example. The same procedures, methods and replacement pistons, properly sized for other makes and models of vehicles are within the scope of the invention. By way of example, similar procedures, methods and replacements pistons may be used with accumulator bores of Toyata®, Generaly Motors® vehicles, Honda®, Mercury®, Linclon®, Mazda®, Land Rover®, BMW®, Audi®, Volvo®, Chrysler®, Nissan®, Jaguar®, Jeep® as well as others. Some specific models include Ford® Fusion® 2006 to present, Five Hundred® 2006 to present; BMW® Mini Cooper® TF-60SN 2002 to 2008, BMW® ZF6HP19-09L, 4HP24, 5HP24 and 5HP19; Avalon® 2006 to present; Camry® 2002 to present, Celica® 2000 to present; Highlander® 2001 to present; Matrix® 2003 to present, Rav4® 2000 to present; Sienna® 2004 to 2008, Solara® 2002 to 2008, Scion® tC and xB models, Lexus® Rx300® 1998 to 2003, RX 330® 2004 to 2006, RX350® 2007 to present, ES300® 1999 to 2003 and ES 330® 2004 to 2006; the accumulator bores of 0-140, U-151, U-240, U-241, U-250 series Toyata® transaxle assemblies for years 1999 present; Mazda® AW6A series (TF80-SSC), Cx7® 2007 to present, CX9® 2007 to present, and MazdaA6®; Land Rover® LR2® 2007 to present; Audi® TF60SM or 09G, TT 2003-2006, Q7 ir TR-60SN RWD 2007 to present; Volvo® TF80SC 90 Series 80 series, V 70 series, 70 series, and S 60 R series; Jeep® and Chrysler® 42RLE and 604-606 RWD versions; Chrysler® 45RFE, 5-45RFE and 68RFE; GM® GM6L50, 6L80 and others; and the VW® and Audi® 09M/09G.

Figure 1:
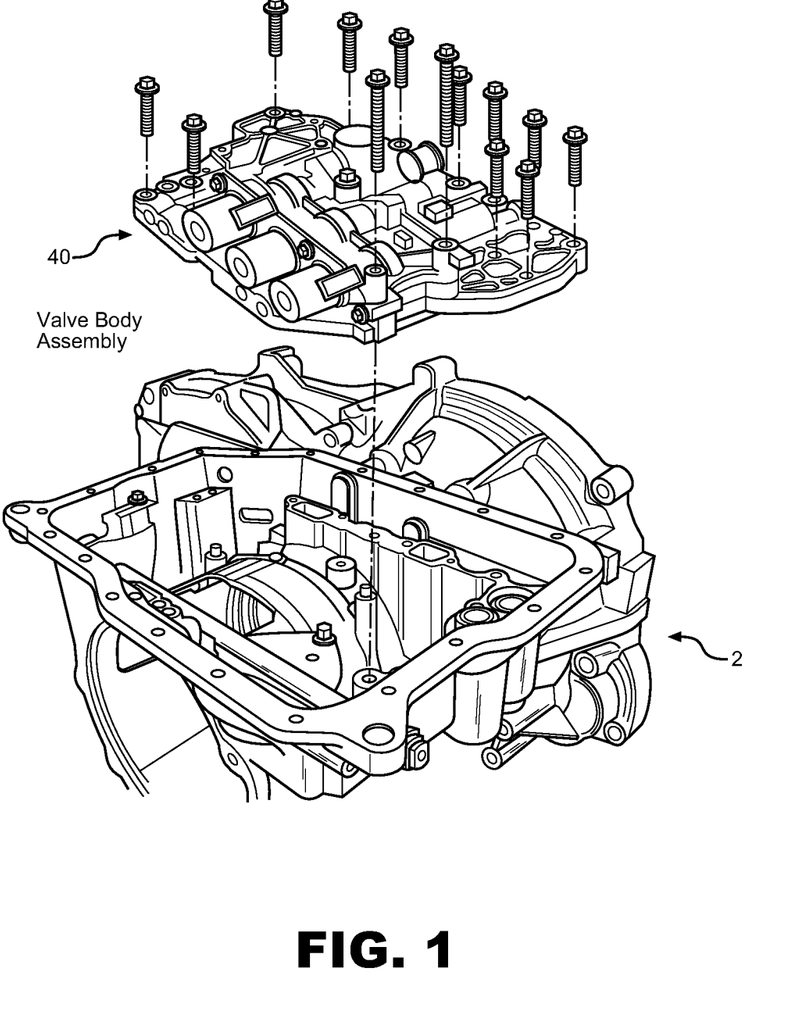
FIG. 1 is an assembly view of a valve body assembly and housing of a 4F27E transmission used in 1999 to present Ford Focus® vehicles, 1999 to present Mazda Protégée® vehicles, and Mazda 3®, Mazda 6® and Mazda J39A® vehicles and showing the valve body assembly removed from the transmission housing.
Figure 2:
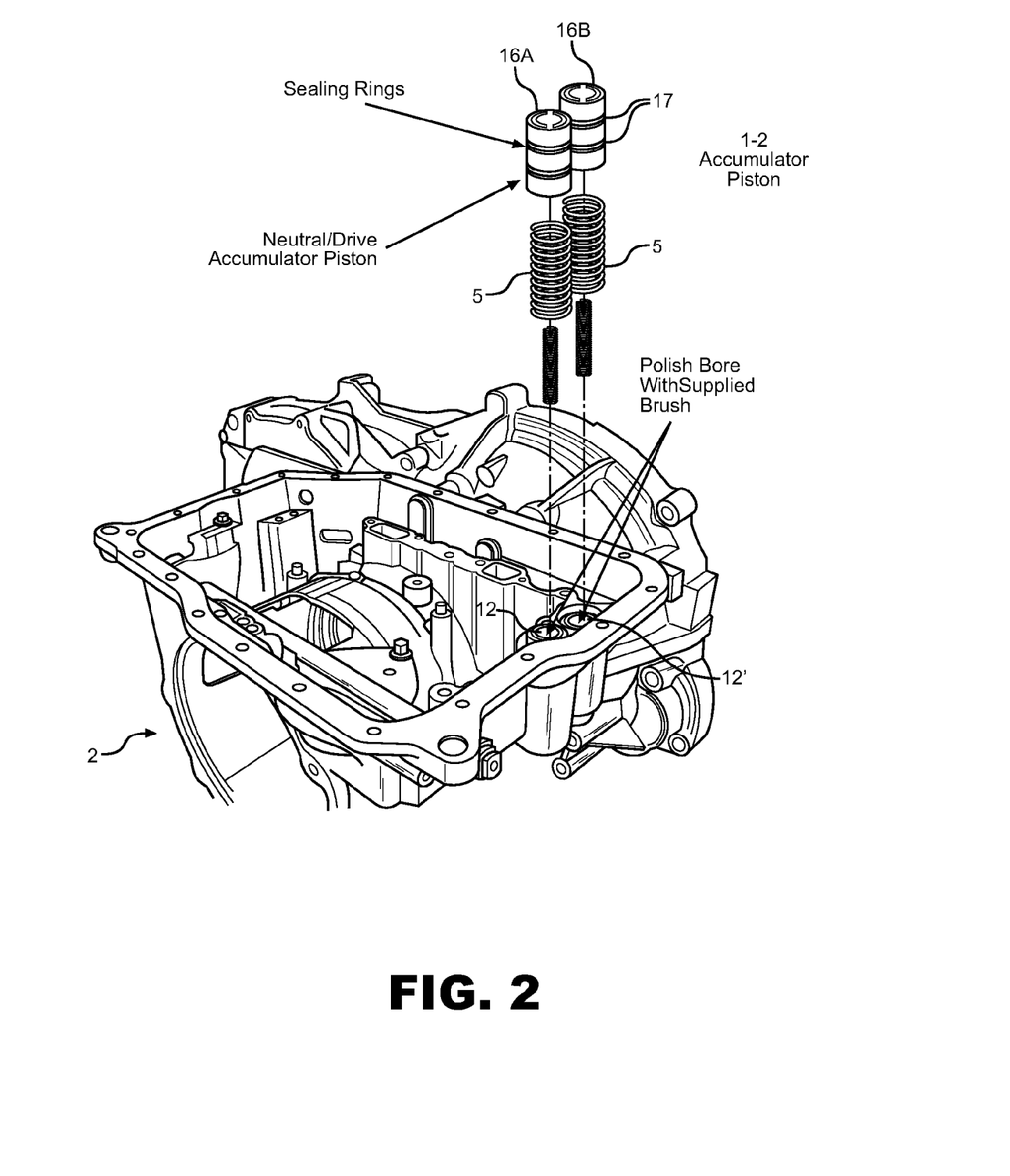
FIG. 2 is an assembly view showing the accumulator pistons of the repair kit of the present invention as they are being placed into the accumulator bores of the transmission of FIG. 1.
Figure 7:
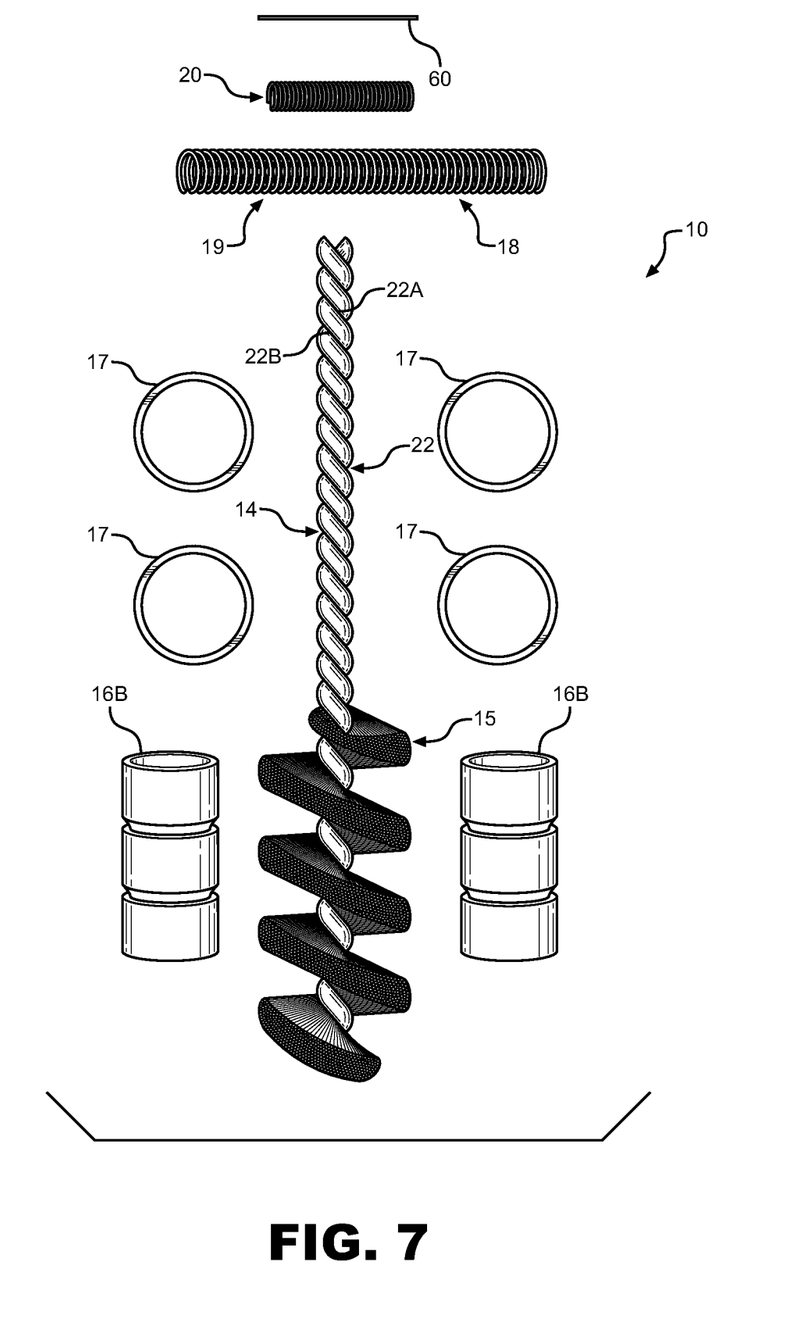
FIG. 7 is a top plan view of a repair and replacement kit in accordance with the invention.

With continued reference to the drawings, the present invention is directed to a kit 10, as shown in FIG. 7 for use in cleaning and polishing accumulator bores 12 and 12', see FIG. 2, by way of example, of a 4F27E transmission 2, see FIG. 1, used in 1999 to present Ford Focus® vehicles, 1999 to present Mazda Protégée® vehicles, and Mazda 3®, Mazda 6® and Mazda J39A® vehicles. The kit not only includes at least one cylindrical rotary brush 14 having nylon bristles 15 impregnated with aluminum oxide for use in cleaning and polishing the accumulator bores, but also includes a pair of interchangeable replacement accumulator pistons 16A and 16B that are used to replace the original pistons. The pistons 16A and 16B are designed to prevent further damage to the accumulator bores through the use of at least one pair of sealing rings 17 associated with each piston. With respect to FIG. 7, the kit 10 may also include one or more replacement springs 18, 19 and 20 for the original equipment solenoid regulator spring, solenoid control valve spring and the pressure regulator spring of the transmission.

Figure 3:
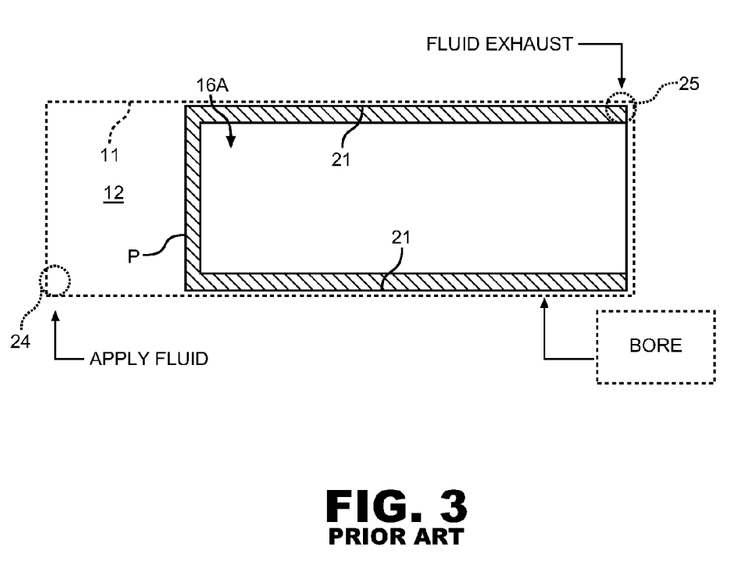
FIG. 3 is a cross sectional view of one of the conventional accumulator bores of FIG. 2, shown in dotted line, in which a replacement piston is reciprocally moved relative to an fluid inlet and supply outlet and showing an area of the internal wall of the bore that becomes scoured by the movement of the piston.
Figure 4:
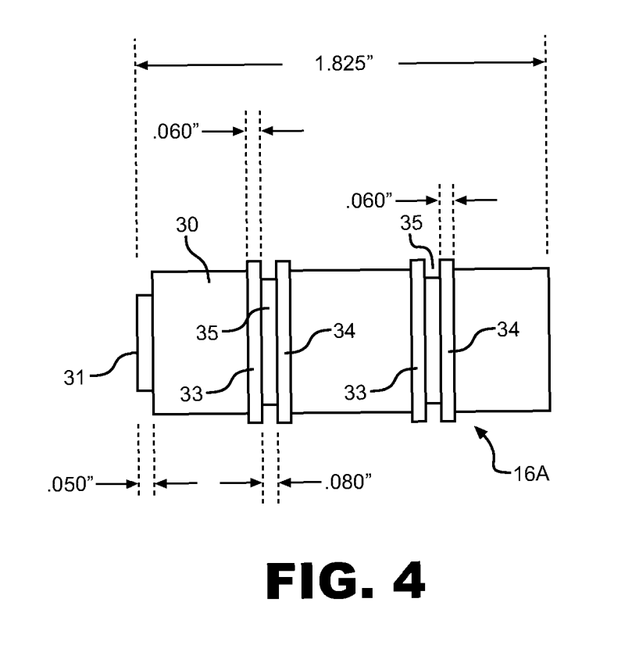
FIG. 4 is a side view of one of the two replacement pistons for use in a refurbished bore in accordance with the teachings of the invention.

As shown in FIG. 3, a central portion 21 of the inner walls 11 of each of the accumulator bores 12 and 12', 12 being shown in FIG. 3, becomes scored by the reciprocating movement of the conventional piston "P" within the bore. In order to prevent transmission leakage and failure, the original equipment accumulator pistons, which are too loosely seated within the bore, must be removed and replaced. However, prior to replacement, the damaged wall portions 11, of each bore, must be cleaned and polished. To do this, a stem or shaft 22 of the rotary brush is mounted within a chuck of a conventional power drill. The size of the bristle head of the brush is equal to or just slightly greater than a diameter of the bores 12 or 12'. With the brush inserted within one of the bores and the drill activated to rotate the brush, a technician moves the brush in a reciprocating motion until each bore is cleaned and polished. As shown, the bristles 15 of the brush are in a spiral configuration and secured to the shaft 22 between a twisted pair of wires 22A and 22B that form the shaft. The configuration of the spiral bristles is such that when the bristle head is positioned within a bore and rotated, the bristles will direct debris from within the bore outwardly thereof toward a drill in which the brush is mounted. The length of the brush is up to approximately 8.0 inches with a bristle diameter or width of approximately 1⅜ inch and length of approximately 2.0 inches.

Once cleaned and polished, and as shown in FIG. 2, the replacement pistons 16A and 16B are inserted within the bores 12 and 12', respectively, with the original equipment springs "S" shown in the drawings inserted within a hollow cavity 23 of each piston so that the pistons are urged toward the intake end 24 of the bores. A fluid exhaust 25 is provided in communication with the end of the bore 12 opposite the intake end, see FIG. 6.

Figure 5:
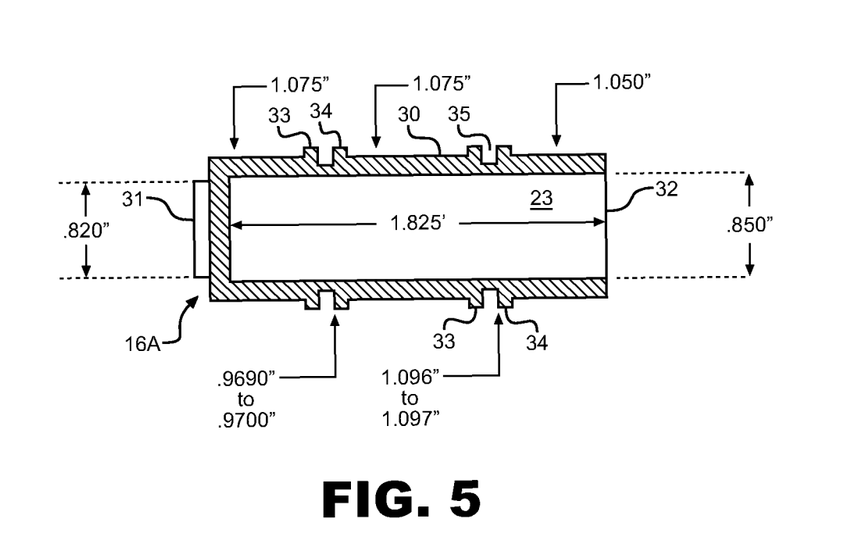
FIG. 5 is a cross section through the piston of FIG. 4.
Figure 6:
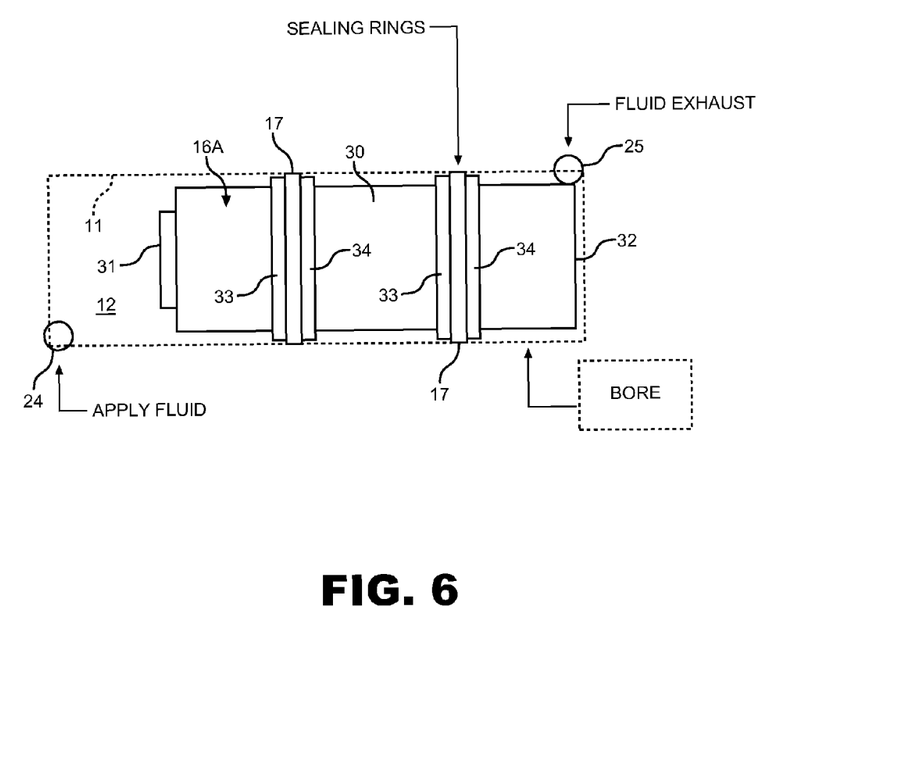
FIG. 6 is an illustrational view of the piston of FIG. 4 mounted within a refurbished bore.

As shown in FIGS. 5 and 6, each replacement piston 16A and 16B includes a cylindrical body 30 having a closed forward end 31 and open rear end 32, with only piston 16A shown in the drawings. Formed integrally with the body 30 are two pair of outwardly extending and spaced annular flanges 33 and 34 that define an annular seat 35 there between in which the annular sealing rings 17 are frictionally mounted. The annular seal rings are preferably made of a low friction material such as Teflon®. The general dimensions of the body 30 are shown on the drawing figures. The sealing rings will extend just slightly outwardly from the flanges 33 and 34 so as to provide a pair of annular seal surfaces that are smooth and will not damage the soft walls of the inside of the bores 12 and 12'. Further, the flanges are spaced such that the sealing rings 17 are generally equally spaced relative to the opposite ends of the piston, so that the pistons are equally balanced within the bores 12 and 13.

Figures 8, 9:
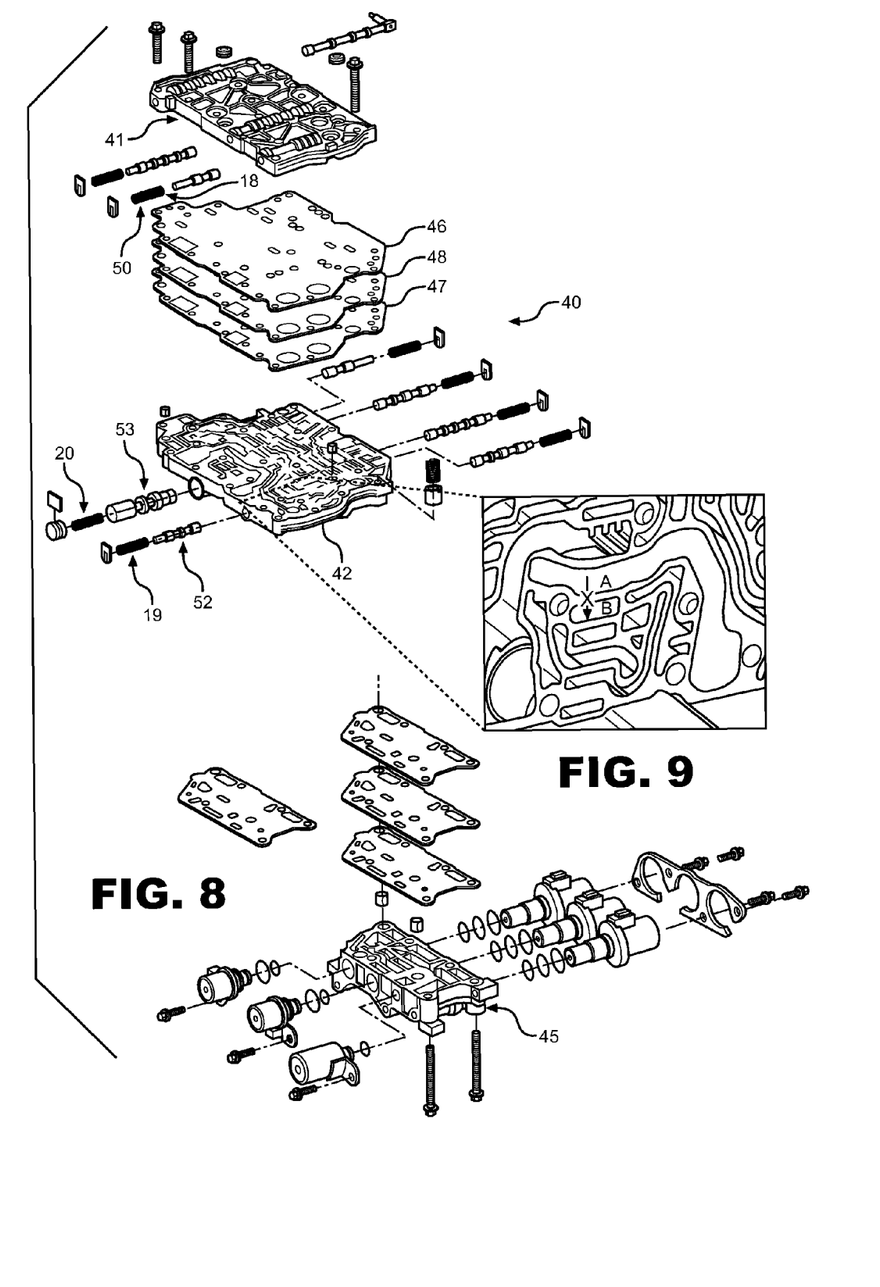
FIG. 8 is an assembly view of the upper and lower bodies of the valve assembly and the solenoid body showing the placement of the two replacement solenoid springs and the pressure regulator springs of the kit of the invention.
FIG. 9 is an enlarged view of a section of the lower body of the valve body assembly of FIG. 8 showing an area in which an additional flow path is established between two fluid circuits in the lower body of the valve assembly in accordance with the teachings of the present invention.

With reference to FIG. 8, the upper and lower bodies 41 and 42 of the valve body assembly 40 are shown in assembly view relative to the solenoid body 45. The upper and lower valve bodies are separated by gaskets 46 and 47 that are on located on opposite sides of a valve body plate 48. For refurbishing of the accumulator bores and the replacement of the pistons, the kit 10, in preferred embodiments, includes three springs 18, 19 and 20 for replacing the original equipment springs of the solenoid regulator, the solenoid control valve and the pressure regulator of the valve assembly. The solenoid regulator 50 includes a original equipment spring having a tendency to break and thus the original spring should be removed and replaced with a more durable spring 18. In a like manner, the original equipment spring of the solenoid control valve 52 has a tendency to weaken over time and due to heat exposure, such that the replacement spring 19, that has been engineered to heavier and less likely to become weaker over time, should be used to replace the original solenoid control valve spring. The third replacement spring 20 of the kit is one for the pressure regulator 53. This is necessary to ensure proper base operating pressures to compensate for normal transmission wear and tear.

As also shown in FIG. 7, the kit may include a drill bit 60, such as a 0.055 inch bit, that may be used to create an opening "X" between passages "A" and "B" of the lower body 42 of the valve assembly to facilitate liquid flow from the line pressure passage or circuit "A" to the lubricating passage or circuit "B" to thereby create better flow of liquid with the transmission, see the enlargement of FIG. 9.

As previously noted, the same method of cleaning and replacement of the accumulator valves may be done on many other vehicles, such as those set forth above. Only the relative sizes and dimensions of the brushes, pistons, sealing rings and springs may change.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A kit for refurbishing accumulator valve bores and replacing accumulator valve pistons in automotive vehicle transmissions, the kit comprising:
   at least one brush having a bristle head portion formed of bristles impregnated with aluminum oxide,
   a pair of replacement pistons each having a body with opposite ends, each replacement piston having a pair of low friction sealing rings mounted in spaced relationship about the body thereof so as to extend slightly outwardly from the body, wherein each of the sealing rings is mounted between a pair of spaced annular flanges that extend outwardly of the body of each of the replacement pistons, whereby when the replacement pistons are mounted within the accumulator bores after the bores have been cleaned with the at least one brush, the pistons will be supported relative to the walls of the bores by the sealing rings.

2. The kit of claim 1 wherein the sealing rings are made of Teflon®.

3. The kit of claim 1 wherein the pairs of spaced annular flanges are equally spaced relative to the opposite ends of each of the replacement pistons.

4. The kit of claim 1 wherein one end of each of the replacement pistons is open while the opposite end is closed.

5. The kit of claim 1 further including at least one replacement spring selected form a group of springs including a solenoid regulator spring, a solenoid control valve spring and a pressure regulator spring.

6. The kit of claim 5 further including a drill bit.

7. The kit of claim 1 wherein the bristle head is formed of bristles mounted in a spiral configuration to a stem of the brush such that when the bristle head is positioned within one of the bores and rotated, the bristles will direct debris from within the bore outwardly thereof.

8. A replacement piston for accumulator valve bores in a transmission of a vehicle, the replacement piston including:
   a body with opposite ends, a pair of low friction sealing rings mounted in spaced relationship about the body so as to extend slightly outwardly from the body, wherein each of the sealing rings is mounted between a pair of spaced annular flanges that extend outwardly of the body, whereby when the replacement piston is mounted within the valve bore, the piston will be supported relative to walls of the bore by the sealing rings.

9. The piston of claim 8 wherein the sealing rings are made of Teflon®.

10. The piston of claim 8 wherein the pairs of spaced annular flanges are equally spaced relative to the opposite ends of each of the replacement pistons.

11. The piston of claim 8 wherein one end of each of the replacement pistons is open while the opposite end is closed.

12. A kit for refurbishing accumulator valve bores and replacing accumulator valve pistons in 4Ff27E transmissions, the kit including at least one brush having a bristle head portion formed of bristles impregnated with aluminum oxide, a pair of replacement pistons each having a body with an open end and an opposite closed end, each replacement piston having a pair of low friction sealing rings, wherein each of the sealing rings is mounted between a pair of spaced annular flanges that extend outwardly of the respective body, so as to extend slightly outwardly from the body, whereby when the replacement pistons are mounted within the accumulator bores after the bores have been cleaned with the at least one brush, the pistons will be supported relative to the walls of the bores by the sealing rings.

* * * * *